United States Patent
Vasseur et al.

(10) Patent No.: US 9,836,696 B2
(45) Date of Patent: Dec. 5, 2017

(54) DISTRIBUTED MACHINE LEARNING AUTOSCORING

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 472 days.

(21) Appl. No.: 14/339,347

(22) Filed: Jul. 23, 2014

(65) Prior Publication Data

US 2016/0026922 A1    Jan. 28, 2016

(51) Int. Cl.
   *G06F 15/18*     (2006.01)
   *G06N 5/04*      (2006.01)
   *G06N 99/00*     (2010.01)

(52) U.S. Cl.
   CPC ........... *G06N 5/048* (2013.01); *G06N 99/005* (2013.01)

(58) Field of Classification Search
   None
   See application file for complete search history.

(56) References Cited

U.S. PATENT DOCUMENTS

| | | | |
|---|---|---|---|
| 7,088,678 B1 | 8/2006 | Freed et al. | |
| 7,606,147 B2 | 10/2009 | Luft et al. | |
| 8,385,199 B1 | 2/2013 | Coward et al. | |
| 8,788,439 B2 | 7/2014 | Martinez et al. | |
| 2013/0148513 A1 | 6/2013 | Szabo et al. | |
| 2014/0025354 A1* | 1/2014 | Padullaparthi | ....... G06N 99/005 703/2 |

OTHER PUBLICATIONS

Lawrence et al. "What Size Neural Network Gives Optimal Generalization? Convergence Properties of Backpropagation", UMIACS-TR-96-22, 1996, pp. 35.*

(Continued)

*Primary Examiner* — Li-Wu Chang
(74) *Attorney, Agent, or Firm* — Parker Ibrahim & Berg LLC; James M. Behmke; Stephen D. LeBarron

(57) ABSTRACT

In one embodiment, a management system determines respective capability information of machine learning systems, the capability information including at least an action the respective machine learning system is configured to perform. The management system receives, for each of the machine learning systems, respective performance scoring information associated with the respective action, and computes a degree of freedom for each machine learning system to perform the respective action based on the performance scoring information. Accordingly, the management system then specifies the respective degree of freedom to the machine learning systems. In one embodiment, the management system comprises a management device that computes a respective trust level for the machine learning systems based on receiving the respective performance scoring feedback, and a policy engine that computes the degree of freedom based on receiving the trust level. In further embodiments, the machine learning system performs the action based on the degree of freedom.

25 Claims, 12 Drawing Sheets

(56) References Cited

OTHER PUBLICATIONS

Sajassi et al., "BGP MPLS Based Ethernet VPN draft-ietf-l2vpn-evpn-07", Network Working Group, May 7, 2014, pp. 1-50.
International Search Report dated Dec. 2, 2015 in connection with PCT/US2015/041258.
Soysal, M. et al: "Machine learning algorithms for accurate flow-based network traffic classification: Evaluation and comparison", Performance Evaluation, Amsterdam, NL, vol. 67, No. 6, Jun. 30, 2010, pp. 451-467.
Pedregosa, F. et al: "Scikit-learn: Machine Learning in Python", arxiv.org, Cornell University Library, 201 Olin Library, Cornell University, Ithaca, NY 01453, Jan. 2, 2012.
Kramer, N. et al: "Kernelizing PLS, degrees of freedom, and efficient model selection", Proceedings of the 24th International Conference on Machine Learning: Jun. 20-24, 2007, Oregon State University, Corvalllis, Oregon, USA, Jan. 31, 2007, pp. 441-448.
Dinuzzo, F. et al: "On the Representer Theorem and Equivalent Degrees of Freedom of SVR", Journal of Machine Learning Research, Jan. 31, 2007, pp. 2467-2495.

\* cited by examiner

DISTRIBUTED MACHINE LEARNING AUTOSCORING

TECHNICAL FIELD

The present disclosure relates generally to computer networks, and, more particularly, to distributed machine learning autoscoring.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

Traditionally, reactive techniques have been used to enforce network performance criteria, such as SLAs. First, the network itself is engineered by defining the application SLAs, quality of service (QoS) parameters, security settings, etc. Next, the performance criteria are monitored in view of the network's performance. If the performance criteria are not met, adjustments may then be made to the network in a reactive manner. Many networking mechanisms exist today to provide on-the-fly guaranteed network performance, such as call admission control, resource reservation, queuing, traffic shaping, etc. However, these tools require careful engineering to perform highly complex tasks in terms of traffic classification, QoS, routing, network and application SLA monitoring, etc. in view of the highly dynamic nature of the traffic and the network. All combined, these techniques make the configuration of a network extremely complicated, while still relying on the fundamental paradigm of reactive networking.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
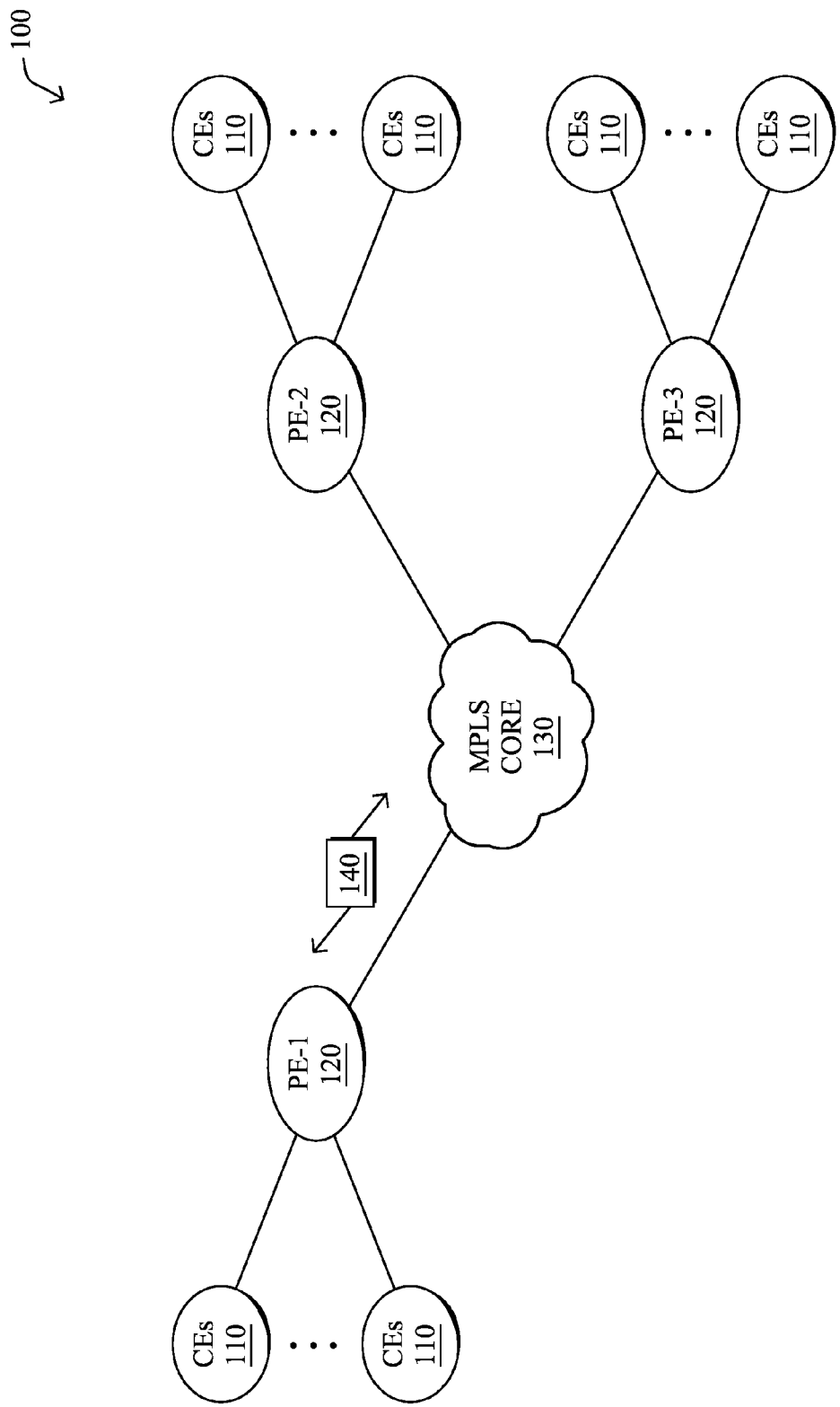
FIG. 1 illustrates an example communication network.

According to one or more embodiments of the disclosure, a management system in a computer network determines respective capability information of one or more machine learning systems, where the capability information includes at least an action the respective machine learning system is configured to perform. The management system may then receive, for each of the one or more machine learning systems, respective performance scoring information associated with the respective action, and computes a degree of freedom for each machine learning system to perform the respective action based on the performance scoring information. Accordingly, the management system then specifies the respective degree of freedom to the one or more machine learning systems. Note that in one embodiment, the management system comprises a management device and a policy engine, where the management device computes a respective trust level for the one or more machine learning systems based on receiving the respective performance scoring feedback, and sends the trust level to the policy engine, which computes the degree of freedom based on the received trust level.

In further embodiments, a machine learning system in a computer network computes a performance scoring feedback associated with an action the machine learning system is configured to perform, and reports the performance scoring feedback to a management system. The machine learning system may then receive, from the management system, a degree of freedom the machine learning system has to perform the action based on the performance scoring feedback. As such, the machine learning system then performs the action based on the degree of freedom.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the ts of a set of rules defining how the nodes interact with each other. Computer networks Transmission Control Protocol/Internet Protocol (TCP/IP). In this context, a protocol consismay be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative Multi-Protocol Label Switching (MPLS) core network 130. Alternatively, or in addition to, routers 110, 120 may be interconnected across a public Internet network. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router (or a set of routers) may be connected to a private network (e.g., dedicated leased lines, an optical network, etc.) or a virtual private network (VPN), such as an MPLS VPN thanks to a carrier network, via one or more links exhibiting very different network and SLA characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to is the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

As will be appreciated, the above topologies are illustrative only and the techniques herein may be used in any other form of computer network. For example, the techniques herein may be adapted for use in a mesh network, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point). Often, an IoT network is implemented with an LLN-like architecture.

Figure 2:
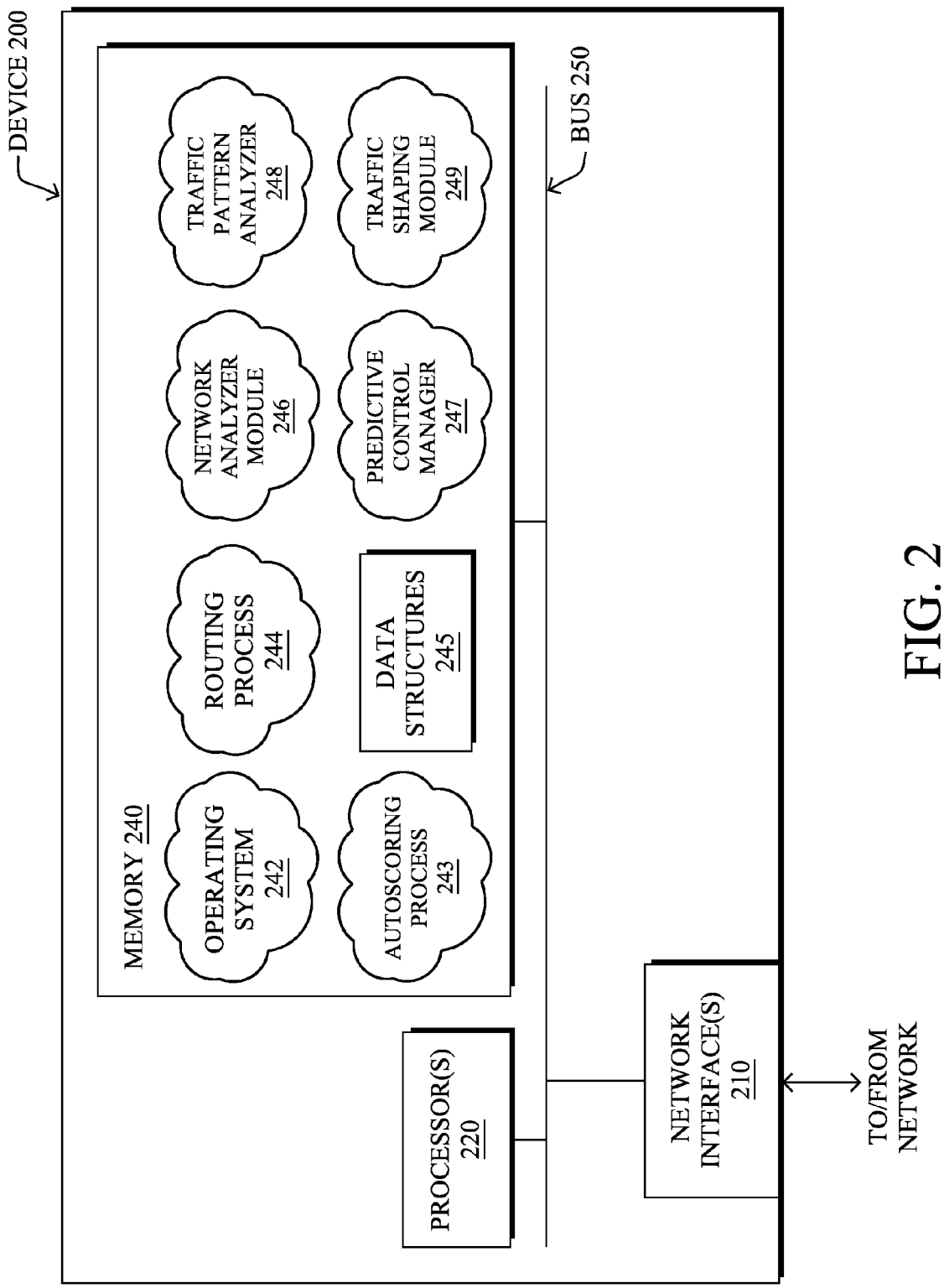
FIG. 2 illustrates an example network device/node.

FIG. 2 is a schematic block diagram of an example node/device 200 that may be used with one or more embodiments described herein, e.g., as any of the routers as shown in FIG. 1, particularly the PEs 120, CE routers 110, a network controller (e.g., a device associated with a network operations center (NOC)), or any other computing device that supports the operations of network 100 (e.g., switches, etc.). The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a network analyzer module (NAM) 246, a predictive control manager (PCM) 247, a traffic pattern analyzer (TPA) 248, a traffic shaping module 249, and/or an autoscoring process 243, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processors, it is expressly contemplated that various processors may be embodied as modules configured to operate in accordance with the techniques herein (e.g., according to the functionality of a similar process). Further, while processors may be shown and/or described separately, those skilled in the art will appreciate that processors may be routines or modules within other processors.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the is core MPLS/IP network.

In some implementations, routing services 244 may include a distributed application policy infrastructure controller (dAPIC) that operates to enforce application-specific policies on the local device. For example, the dAPIC may receive application-specific SLAs from a network controller via application programming interface (API) calls. Such information may be used, in some cases, to make routing decisions based on the type and priority of an application, as well as the performance of the various network links available to the device. In other words, the dAPIC in routing services 244 may be part of an application centric infrastructure (ACI) that operates to centralize network automation and facilitate the use of policy-driven application profiles throughout the network.

As noted above, traffic and network characteristics may be highly dynamic, making WAN optimization challenging. In addition, the variety of access links that may be involved (e.g., cable, A/V/DSL, links over private or public networks, etc.), potentially with guaranteed SLAs or semi-guaranteed SLAs, further complicates the task of network optimization. In some cases, customer sites may also be connected to backup links (e.g., 3G/4G/LTE wireless links) that provide highly varying performance in terms of connectivity and bandwidth.

Figure 3:
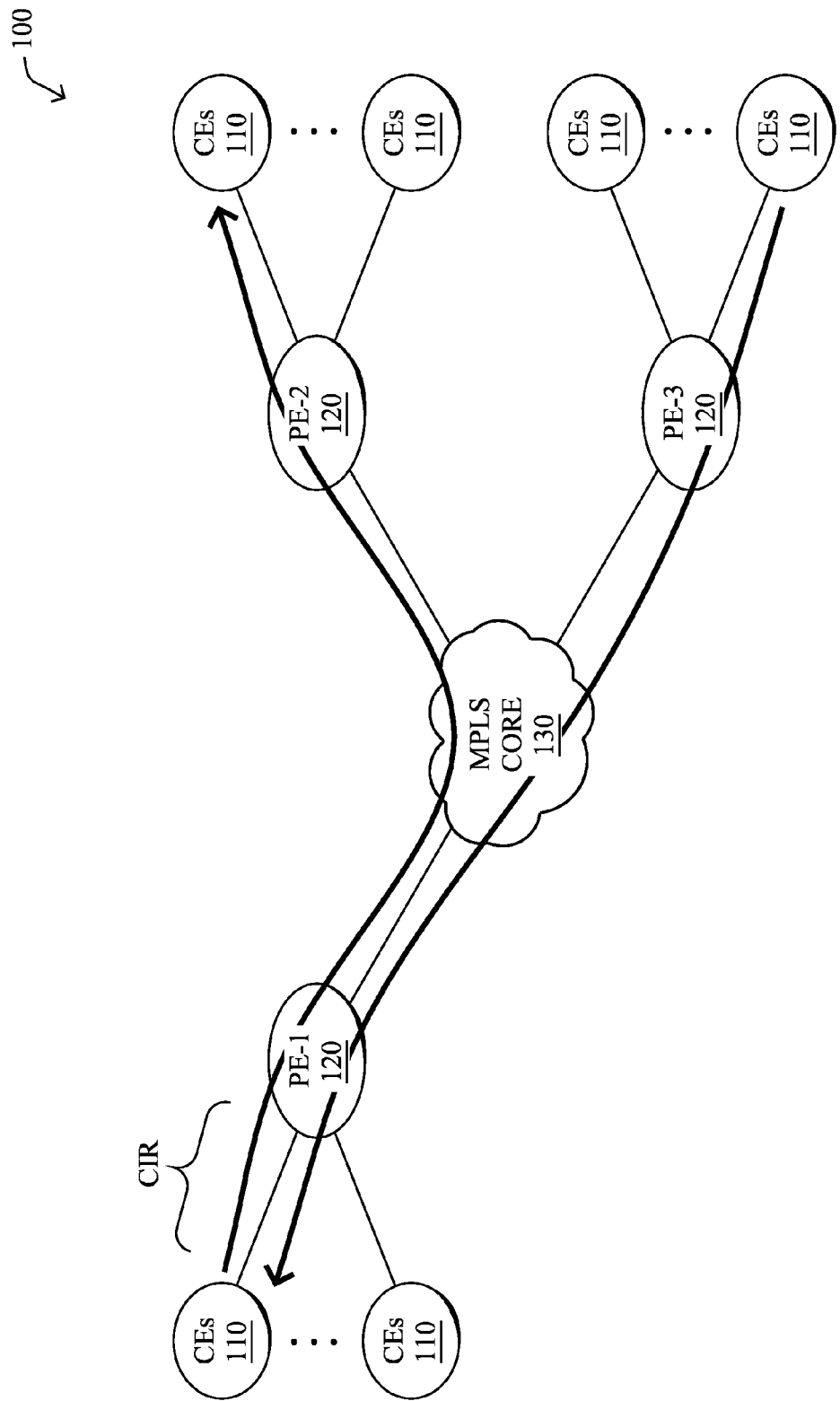
FIG. 3 illustrates an example view of traffic flowing within the communication network of FIG. 1.

Numerous types of application traffic may be flowing through current day networks. For example, as shown in FIG. 3, a particular CE 110 located at a customer site may provide and receive different forms of application traffic that is communicated through network 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end is users.

Reactive networking has been the traditional network-engineering paradigm for the past three decades: indeed, policies and rules-based actions are first to determine the required Service Level Agreement (SLA) and the traffic is then classified (colored) using the DSCP field either by the application itself or input routers such as due to Deep Packet Inspection. Routing engineering is a true manual operation. Tunnels are set using various automated mechanisms to ensure security, and traffic monitoring is then performed in order to verify that the required SLAs are indeed met. As pointed out above, new performance-based routing approaches have been designed, but are fundamentally reactive: once the traffic is routed over a specific (pre-determined path), alarms are dynamically generated by the remote end upon SLA violation that may trigger the rerouting of the traffic.

A different approach to reactive routing, however, consists in relying on the concept of predictive networking whereby network analytics is used in order to predict traffic patterns and networks characteristics using machine-learning algorithms. Such an approach is a fundamental paradigm shift contrasting with existing approaches and allowing for non a priori rules-based, manual configuration, significantly more optimal network decisions (for QoS, routing, etc.), predictive performance and thus a significant reduction of risk of violating application SLAs and a significant improvement in terms of "ease of use" for the end user, as well as shorter networking tuning cycles when new applications are enabled in the network.

In particular, according to various embodiments herein, a predictive performance methodology for WANs and other forms of networks is introduced that that allows for its use across varying network architectures, application requirements, and deployment strategies, as well as in the presence of dynamic traffic and network performance. As detailed below, such an architecture may make use of machine learning techniques, in some embodiments, to evaluate future network requirements and performance, and to take corrective measures within the network to ensure the SLAs are met.

According to various embodiments described herein, a dynamic, predictive performance architecture is disclosed that may be implemented in a network, such as a multi-service, multi-carrier WAN. In particular, NAM 246, PCM 247, TPA 248, and/or traffic shaping module 249 may operate in conjunction to perform predictive networking, in contrast with existing approaches that rely on reactive networking techniques. In some aspects, TPA 248 may be responsible for tracking all possible attributes of the traffic that is flowing through a router or other device, in order to make predictions regarding the traffic. For example, these attributes may be used to characterize traffic flows over the course of time and to generate profiles that can be used for prediction. In another aspect, NAM 246 may be used to generate an analytical model of the attributes of the network (potentially as a function of time), in order to predict network performance. In a further aspect, PCM 247 may gather application-specific SLAs (e.g., from the ACI controller/dAPIC of routing services 244) and correlate the application-specific SLAs with the predicted traffic profile and network performance, to perform closed-loop control that meets the application-specific SLAs. Traffic shaping module 249 may operate to determine network characteristics, such as those used by NAM 246. In various implementations, processors 244 and 246-249 may be co-located or may be distributed across different network devices. Further, while certain functions are described herein with respect to a particular one of processors 244, 246-249, the functions may be incorporated into any of the other processors, in various other embodiments.

Figure 4A:
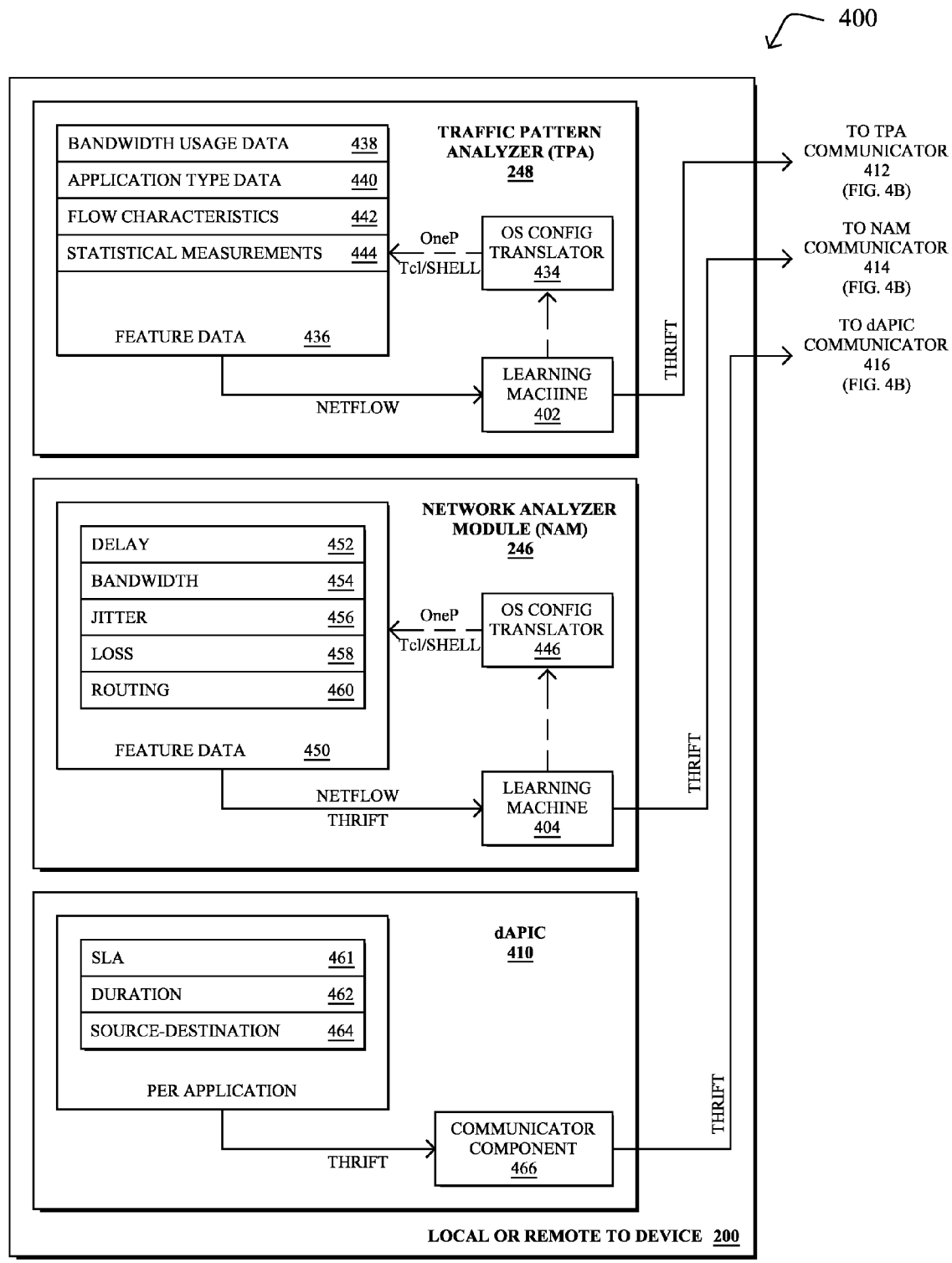
FIGS. 4A-4B illustrate an example architecture for predictive networking.
Figure 4B:
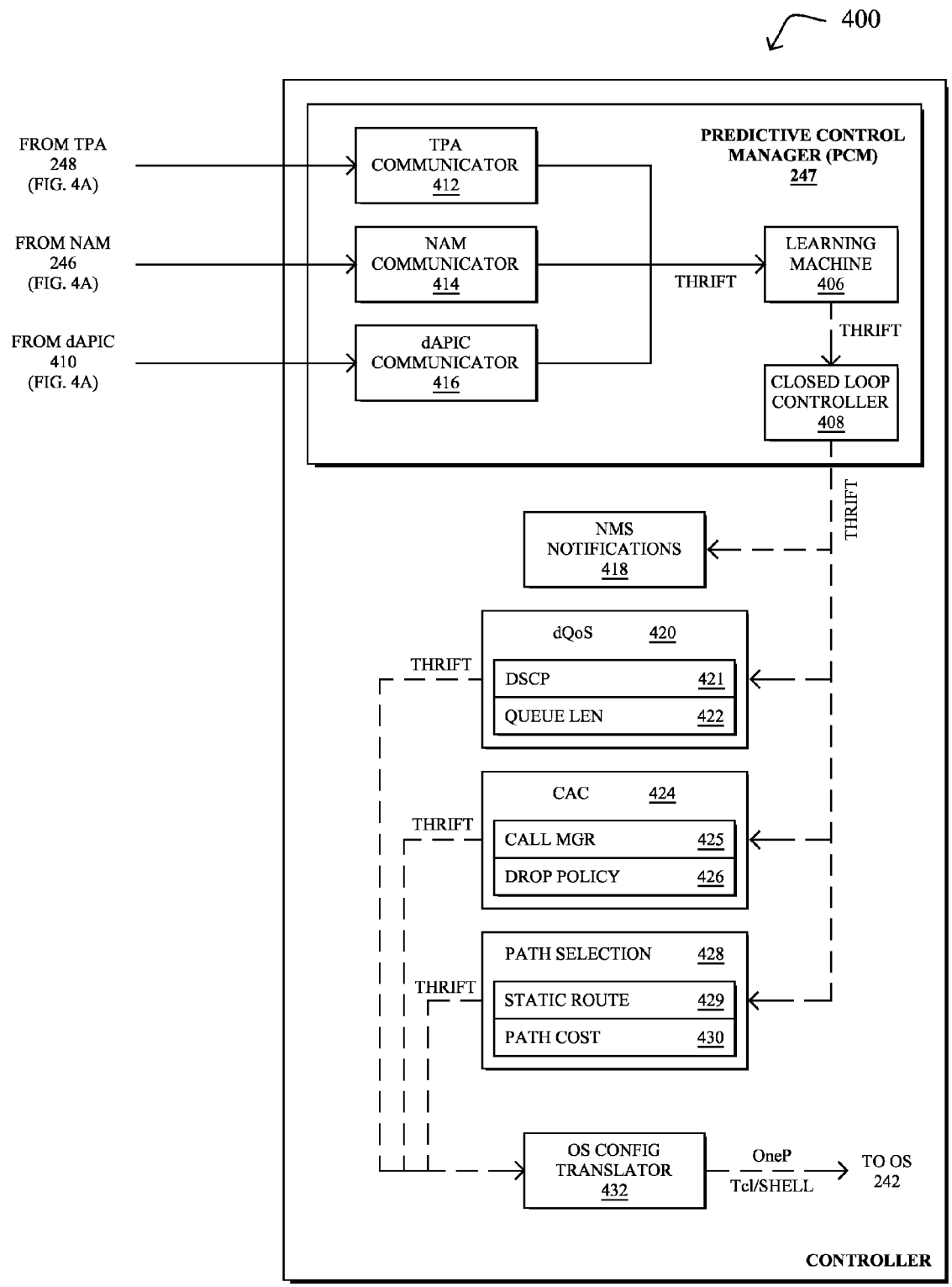

Referring now to FIGS. 4A and 4B, an example architecture 400 for predictive networking is shown in greater detail, according to various embodiments. As shown in FIG. 4A, TPA 248, NAM 246, and/or a dAPIC 410 may be local or remote to a given device 200. In FIG. 4B, PCM 247 may be hosted on a different device, such as a network controller, or may be integrated into the same device as that illustrated in FIG. 4A, in various embodiments.

Underlying the functionality of NAM 246, PCM 247, and/or TPA 248 may be learning machines 404, 406, and 402, respectively. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning machines (e.g., learning machines 402-406) are computational entities that rely on one or more machine learning processors for performing a task for which they have not been explicitly programmed to perform. In particular, learning machines are capable of adjusting their behavior to their environment. For example, a learning machine may dynamically make future predictions based on current or prior network measurements, may make control decisions based on the effects of prior control commands, etc.

Learning machines 402-406 may employ any number of different machine learning techniques. For example, artificial neural networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Other forms of machine learning techniques that may be employed by learning machines 402-406 may include, but are not limited to, support vector machines (SVMs), Bayesian networks, regression techniques (e.g., logistic regression, linear regression, non-linear regression, etc.), combinations thereof, or any other form of machine learning.

In various embodiments, TPA 248 may reside within a router or on a host computing device, and may have connectivity to one or multiple routers in the network. In general, TPA 248 may be operable to analyze every facet of the traffic flowing through the router. For example, TPA 248 may receive traffic-related data from the operating system of the device via an OS configuration translator 434, such as from an application visibility and control (AVC) process that is configured to classify traffic data according to application type (e.g., Cisco AVC® of Cisco Systems, Inc.), a network traffic flow process (e.g., Cisco IOS Flexible Netflow® of Cisco Systems, Inc.), a media metrics process (e.g., a process that generates metrics regarding video streams), etc. These or other such reporting technologies may be used by TPA 248 to compute a set of input feature data 436 (e.g., attributes that capture the characteristics of the traffic), that may be used by learning machine 402 to predict a traffic profile.

Feature data 436 may include any or all of the following information:

1.) Bandwidth Usage Data 438: In some cases, feature data 436 may include data regarding the bandwidth usage of a particular type of traffic (e.g., application-specific bandwidth usage information). This information may provide a profile of the traffic over the course of time to learning machine 402.

2.) Application Type Data 440: Feature data 436 may include data regarding the various application types associated with the traffic (e.g., VoIP, video, etc.). In various embodiments, application types may be determined based on the port numbers used, via an application recognition utility (e.g., Network Based Application Recognition® of Cisco Systems, Inc.), or the like.

3.) Flow Characteristics 442: In some cases, feature data 436 may include traffic flow information such as the duration of a flow, the rate of new flows, metrics capturing the rate of change of the previous metrics over time, or other such information. These flow characteristics may be captured from underlying infrastructures such as an application recognition utility, a call manager, or the like.

4.) Statistical Measurements 444: In some embodiments, feature data 436 may include statistical measurements regarding the flow of traffic. For example, measurements 444 may include data regarding the moments (e.g., variance, skewness, kurtosis, etc.) of the traffic distribution, both in terms of packets/sec and bytes/sec, on a per flow basis, or on a per time path basis. In another example, measurements 444 may include other statistical properties of the traffic flow, such as autocorrelation, Fourier series coefficients, etc.

Together, feature data 436 can be used by learning machine 402 to determine characteristics of the underlying traffic flow and how it changes with time. Once learning machine 402 starts to develop a time series model using these attributes, for example, it may decide that it needs more information about some of these features or, conversely, that some of these features are not relevant. In such cases, the update rate of the features may be adjusted accordingly by TPA 248 (e.g., to reduce the update rate of irrelevant data, etc.). In one embodiment, adjusting the refresh rate of feature data 436 may be policy-based to reduce traffic overhead in the network. For example, certain features may be collected or refreshed at different rates depending on the time of day, to reduce adverse effects on the network from the collection.

In some implementations, TPA 248 may require some processing capabilities that are not available on the router carrying the actual traffic itself. In such cases, TPA 248 may be hosted on a different router/host, which may be co-located either on a router blade (e.g., a UCS blade), or a different router/host connected to the router via a high bandwidth link.

According to various embodiments, NAM 246 may reside on the router processing the traffic under analysis itself or on a host that has network connectivity to the concerned routers. In general, NAM 246 may be operable to track all the network conditions that are visible to the corresponding router, in order to model the network performance characteristics. In contrast with reactive approaches, NAM 246 may be used to compute a model of the network performance using learning machine 404. For example, NAM 246 may determine the performance of each link/path available to connect a remote/branch office to a corporate network or headquarters.

Similar to TPA 248, NAM 246 may gather feature data 450 that is used as inputs to learning machine 404 (e.g., via OS configuration translator 446). For example, feature data 450 may be determined in part by sending probes between a given sender and a given responder, to capture metrics regarding the performance along the path. Other sources of feature data 450 may also include any or all of the sources used to determine feature data 436. In various embodiments, feature data 450 may include any or all of the following information:

1.) Delay Information 452: In some cases, feature data 450 includes delay measurements along a given network path and/or link.

2.) Bandwidth Information 454: Feature data 450 may also include bandwidth information associated with a given network path and/or link. For example, bandwidth information 454 may include data regarding the total bandwidth usage of the path or link, the per-application bandwidth usage of the path or link, available bandwidth along the path or link, etc.

3.) Jitter Information 456: Feature data 450 may further include jitter information associated with a given path and/or link. For example, the total amount or application-specific jitter measurements along a path or link may be included in feature data 450.

4.) Packet Loss Information 458: In some cases, feature data 450 may include packet loss information, such as a measured packet loss rate along a given path and/or link.

5.) Routing Information 460: Associated with any of data 452-458 may be information regarding a given network path (e.g., the link or set of links for which the measurements of data 452-458 were determined).

Learning machine 404 may continually track feature data 450 (e.g., as a time series model), to characterize these attributes. In other words, learning machine 404 may use a predictive model to predict future network performance metrics based on feature is data 450. In some implementations, NAM 246 may also adjust the collection of feature data 450. For example, NAM 246 may configure one or more corresponding routers to generate more or less features based on the requirements of learning machine 404 (e.g., the amount of probing used may be adjusted as a function of the model's accuracy and confidence, based on network considerations such as current or future network usage, etc.).

In some embodiments, learning machine 404 may use the principle of data fusion to model the network performance metrics. This principle generally functions by integrating multiple data sources and knowledge about a real-world process (in this case, the underlying network), into an accurate representation of the functioning of the network. For example, bandwidth data 454 along a given path may be available from any of the following source: (1) SLA processors may yield data about the delay, jitter and packet loss, which can, in some circumstance, be used to estimate the available bandwidth via a regression model, such as variational Bayesian least squares (VBLS) regression model, (2) actual bandwidth measurements can be taken occasionally, but with care as they affect the network performance, or (3) time-series models such as autoregressive moving average (ARMA) models, Hidden Markov Models, Gaussian Processors can be used to predict the performance evolution.

Feature data 450 available from various sources of information can be fused by NAM 246 in real time in a mathematically principled way by using a Kalman filter or graphical models, whereby the intrinsic uncertainty of each source of information is accounted for in the estimation of the data (e.g., available bandwidth, etc.). For example, if one makes a direct measurement of the actual bandwidth at time t, the uncertainty on this measure is very small, and it should therefore have a very strong impact on the estimation process at time t. However, as t increases, the uncertainty also increases as the actual bandwidth may drift away from the initial measurement. This drift may then be captured via a time-series model, and complemented by indirect measurements (e.g., based on delay, jitter, etc. measurements). As long as both sources agree, there is no is reason to perform any further direct measurement, which may be very expensive, but if the prediction of the time-series model and the regression diverges, this may trigger another direct measurement. In some embodiments, NAM 246 may determine whether a direct measurement of any of feature data 450 is needed based on a measure of confidence associated with a model used by learning machine 404.

In some implementations, dAPIC 410 may store and provide various application-specific data via a communicator component 466. In general, dAPIC 410 may be operable to ensure that all the application SLAs are being met at all times in the network and, consequently, perform various actions without human intervention, to dynamically adapt the network behavior as needed. Accordingly, dAPIC 410 may have access to various application-specific SLA information such as SLA data 461 (e.g., a set of SLAs), duration data 462 regarding the SLAs (e.g., when a particular SLA is to be enforced), and/or source-destination data 464 regarding the network paths used by the various applications.

In various embodiments, TPA 248, NAM 246, and dAPIC 410 may provide data to PCM 247 shown in FIG. 4B, which may be co-located with these modules or may be hosted on another device (e.g., in a network controller, in the cloud, etc.). Accordingly, PCM 247 may include communicator modules 412, 414, and 416 to communicate with TPA 248, NAM 246, and dAPIC 410, respectively. In one embodiment, PCM 247 receives traffic model data generated by learning machine 402 from TPA 248 via communicator module 412. In a further embodiment, PCM 247 receives network performance model data generated by learning machine 404 from NAM 246 via communicator module 414. In yet another embodiment, PCM 247 may receive application-specific SLA data from dAPIC 410 (e.g., data 461-464), which may have information about all of the applications in the network, as well as their corresponding SLA requirements.

If an application SLA is predicted not to be met, PCM 247 may take any number of corrective measures to ensure that the SLAs continue to be met (e.g., by sending is commands to OS 242 via an OS translator module 432). In some implementations, the corrective measures may be performed via a closed loop controller 408, thereby allowing feedback (e.g., updated predictions from TPA 248 and NAM 246) to be used by PCM 247 when taking corrective measures. In one embodiment, PCM 247 may generate and send a notification 418 to a network management system (NMS), allowing a human operator to intervene, if necessary, at the appropriate place and time in the network.

In another embodiment, PCM 247 may dynamically generate new QoS parameters 420 such that application-specific SLAs continue to be met. Example QoS parameters may include differentiated services code point (DSCP) parameters 421, queue length parameters 422, further parameters that change bandwidth percentage allocations to different classes, parameters that change the class of service for applications, etc.

In a further embodiment, PCM 247 may change call-admission control (CAC) policies 424 used as part of a communications management system. For example, CAC policies 424 may include parameters 425 for a call manager system (e.g., a system that tracks and manages active VoIP network components), drop policy parameters 426, or the like. Such parameters may be used, in some cases, to prevent admission of new traffic flows if the available bandwidth is already fully used.

In another embodiment, PCM 247 may generate path selection parameters 428. In general, path selection parameters 428 may operate to ensure that, based on a particular application type, the corresponding traffic is routed over different paths such that all applications continue to meet their SLAs. For example, path selection parameters 428 may include one or more static routes 429 to be used by a particular type of application traffic, path cost values 430 used to make routing decisions, or any other data that may be used to adjust which paths are used in the network by a particular type of application traffic. For example, traffic of class X may suddenly have to be routed over a 3G/4G link (although more costly) for a period of time T in order to meet the required SLA received from dAPIC 410 (e.g., application-specific SLAs 461), according to the predicted traffic from the TPA 248 and expected network characteristics from NAM 247.

Notably, such a predictive architecture 400 supports different modes of operation. In some cases, the system may request human intervention as part of the control loop. In other words, PCM 247 may operate as a distributed recommendation system for network parameter changes that should be adjusted in order to meet the SLAs (e.g., by sending NMS notifications 418 for review by a network engineer). In other cases, the system may be fully autonomous by employing closed loop control to make decisions on a router in real-time and report on the decisions to a human operator afterwards. As will be appreciated, the various modules described in architecture 400 may also communicate using remote procedure calls (RPCs) (e.g., using the Apache Thrift® protocol from the Apache Software Foundation or another RPC protocol), allowing the depicted modules to be co-hosted by a device or located remotely on different devices. Communications with the operating system of the device may also be performed using any suitable technique, such as by sending scripts through a Tcl/Shell.

Machine Learning Autoscoring

Self-Learning Networks (SLN), such as networks employing machine learning techniques, allow for a true paradigm shift in networking moving from a reactive to a proactive/predictive mode of operation, solving a number of complex issues. For instance, SLNs may be used in a number of critical use cases such as adaptive security and predictive performance analytics (PPA). A current use case of SLNs is the use of PPA in the context of an intelligent WAN (IWAN) made of a collection of tools, protocols and algorithms, which combined, allows for the support of a variety of remote office topologies and support of a wide range of traffic (from highly business critical traffic to recreational traffic).

Still, SLNs bring their own set of challenges, not the least of which is the ability to "control" the system. That is, knowing that the learning ability of SLN allows it to eventually make autonomous decisions tackling highly multidimensional problem spaces, it is important to allow administrative control over the decisions of the network.

The techniques herein specify a feedback loop approach where machine learning systems are enabled with "autoscoring" and an end-user management system can control the degree of autonomy left to the machine learning system based on the scoring. In other words, the techniques herein allow an end-user to control the degree of liberty provided to a machine learning based system (MLS) based on a scoring system that takes into account the performance of the MLS in order to control the degree of liberty given its observed performance. A feedback loop is used for the MLS to report its scores (e.g., ability to perform a given action such as a prediction estimate) and for the end user (or MLS) to make use of an algorithm used to assess the performance of the system and consequently adjust the degree of the system in performing a given task that is provided to a policy engine. In particular, the techniques herein rely on an autonomous learning entity (machine learning based) to perform a set of functions while providing a level of control to the user according to the estimated performance of the system (e.g., used a credit-based algorithm), as described herein.

Specifically, according to one or more embodiments of the disclosure as described in detail below, a management system in a computer network determines respective capability information of one or more machine learning systems, where the capability information includes at least an action the respective machine learning system is configured to perform. The management system may then receive, for each of the one or more machine learning systems, respective performance scoring information associated with the respective action, and computes a degree of freedom for each machine learning system to perform the respective action based on the performance scoring information. Accordingly, the management system then specifies the respective degree of freedom to the machine learning systems. In one embodiment, the management system comprises a management device that computes a respective trust level for the one or more machine learning systems based on receiving the respective performance scoring feedback, and a policy engine that computes the degree of freedom based on receiving the trust level. In further embodiments, the machine learning system performs the action based on the is degree of freedom.

Illustratively, the techniques described herein may be performed by hardware, software, and/or firmware, such as in accordance with the autoscoring process 243, which may include computer executable instructions executed by the processor 220 to perform functions relating to the techniques described herein. For example, the techniques herein may be treated as extensions to machine learning processes and protocols, and as such, may be processed by similar components understood in the art that execute those processes and protocols, accordingly.

Operationally, a first aspect of the techniques herein involves specifying a discovery mechanism so as to allow an end user or a network management server (NMS) to dynamically discover a set of Machine Learning-based systems (MLS) and their respective capabilities.

For example, as mentioned above, an architecture is specified for predictive performance analysis of multi-service, multi-carrier WANs, which is made of several components:

The TPA engine responsible for tracking all possible attributes of the traffic that is flowing through a router, in order to perform prediction of the user traffic.

The NAM building an analytical model of the network attributes (potentially as a function of time) in order to predict the network performance (as opposed to existing techniques based on active/passive probing of the network).

The PCM engine responsible for gathering the application SLA interacting with the ACI (Application Centric Infrastructure) controller, correlating the application SLAs with the predicted traffic profile and network performance in order to perform closed-loop functionality to meet the application SLA.

In this first aspect, a discovery mechanism of ML-based systems is specified, where an ML-based system (MLS) refers to one or more ML algorithms performing a given task. For example, the TPA in charge of building a predictive model for the available network resources is a system that may itself be made of several ML algorithms.

Figure 5:
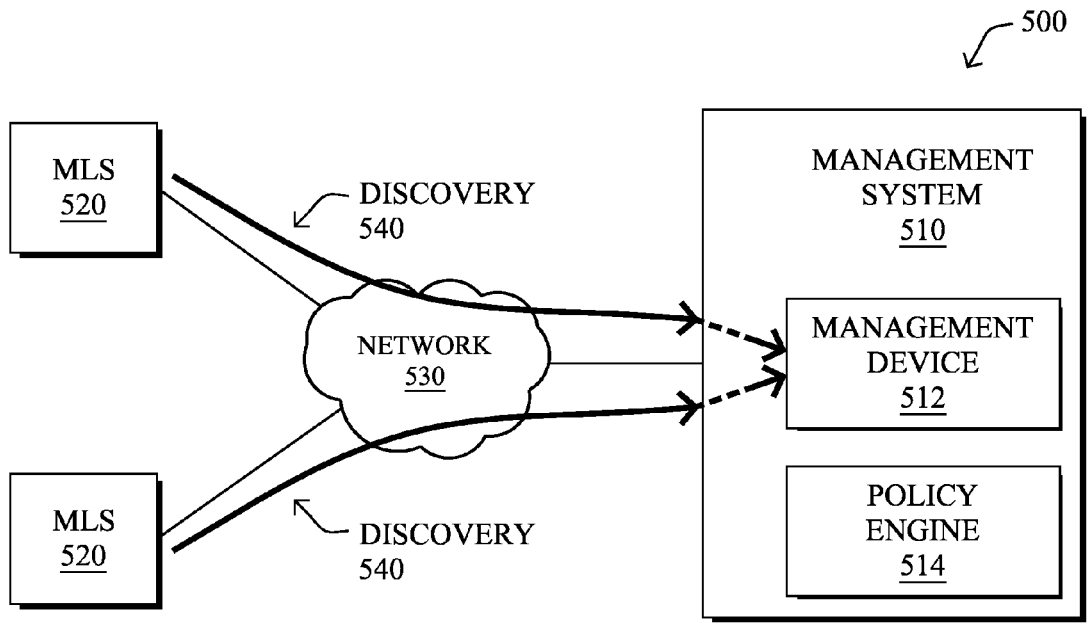
FIG. 5 illustrates an example simplified machine learning architecture and machine learning system discovery.

With reference to FIG. 5, a simplified view of a network 500 may comprise a management system 510 (e.g., optionally made up of a management device (e.g., NMS) 512 and a policy engine 514), which is in communication with one or more machine learning systems 520 via a network 530 (e.g., any type of network, such as those described above).

Through discovery messages 540, the management system 510 may learn that each machine learning system 520 is characterized by a set of attributes and parameters such as:
  IP address of the device hosting the system;
  Task or "action" performed by the system (predicting bandwidth, user traffic, etc.);
  The scoring technique used by the system to measure its own performance (for example the MLS may report the MRE (Mean Relative Error) of its prediction); and
  Potentially a number of different parameters useful for controlling the performance of the system.

Such parameters may be encoded within the discovery message 540, such as by using a newly defined XML schema and/or newly defined fields as an additional component of conventional protocol extensions. In one embodiment, the fields (e.g., type, length, value, or "TLV" fields) may be encapsulated in a newly specified OSPF Opaque LSA Type 10 or 11, a new DAO option for the RPL routing protocol, a new ISIS TLV or even a BGP attribute such as a new NLRI (should the end user of NMS reside in a different AS than the LM systems), as may be appreciated by those skilled in the art.

In an alternative embodiment to dynamic discovery above, for ML-based systems with non-dynamic attributes (i.e., "static discovery"), the MLS 520 may be discovered is using other protocol extensions such as DHCP options or DHCP_Inform messages as the message 540.

Figure 6:
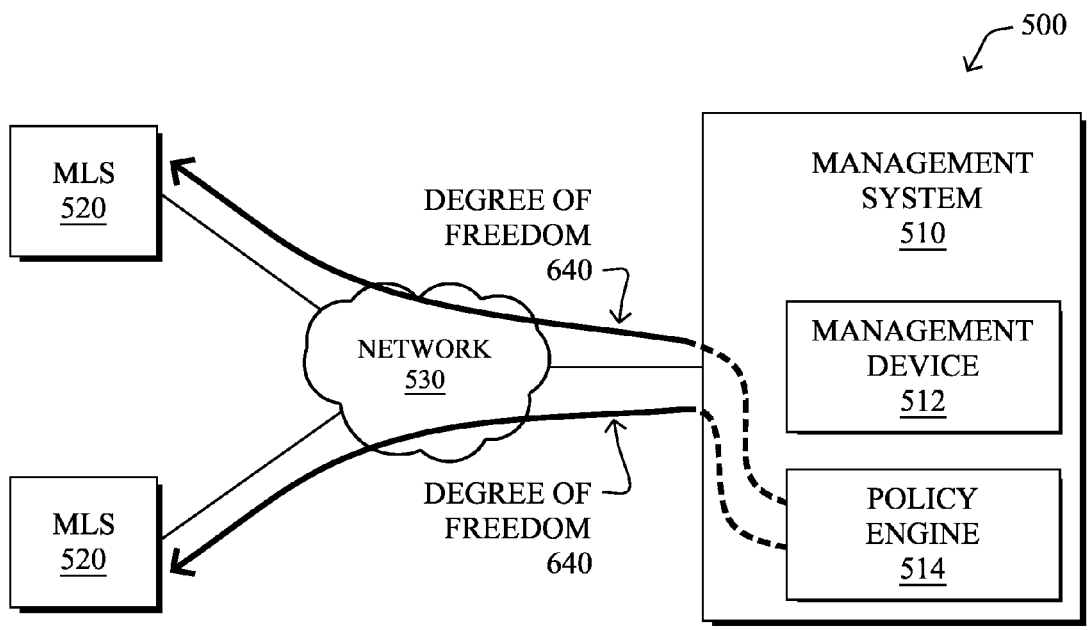
FIG. 6 illustrates an example communication of a degree of freedom.

Additional aspects of the techniques herein as described below specify the scoring process used between an (automatically discovered) MLS 520 hosted on a node "i" (MLSi) and the management system 510, particularly the policy engine (PE) 514 and the end-user/NMS management device 512. For instance, with reference to FIG. 6, the management system 510 (e.g., policy engine 514) may send a message 640 specifying the MLSs' individual "degree of freedom", as described below.

In particular, in one embodiment, the machine learning policy engine (MLPE) 514 (which may be a separate device from the management device 512 or else an integral component within a management system 510) specifies to each MLS their authorized degree of freedom in terms of action. For example, consider the case of a system made of a NAM predicting the available bandwidth of a link that provides the model to a PCM in charge of adjusting a traffic shaper. The role of the MLPE 514 is to specify the degree of freedom of the PCM. For the sake of illustration, the PCM may at first not be allowed to perform any shaping adjustment (the system is not trusted by the end user), or the PCM may make adjustments limited to x % change, which may increment over a period of time T.

Another example might be with an MLS in charge of making a predictive path selection. In such a case, the system 520 may at first not be allowed to make any path change, then (once the level of trust specified below increases), traffic may be rerouted if the expected level of QoS improvement predicted crosses a given threshold, up to having a total degree of freedom.

Figure 7A:
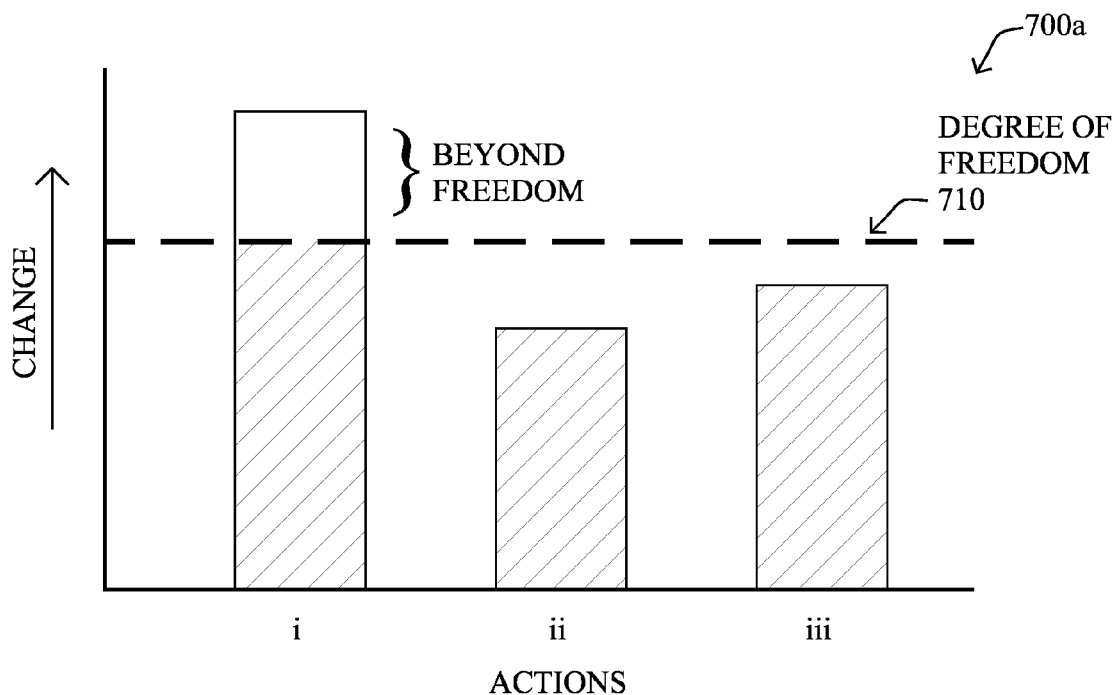
FIGS. 7A-7C illustrate examples of degrees of freedom.
Figure 7B:
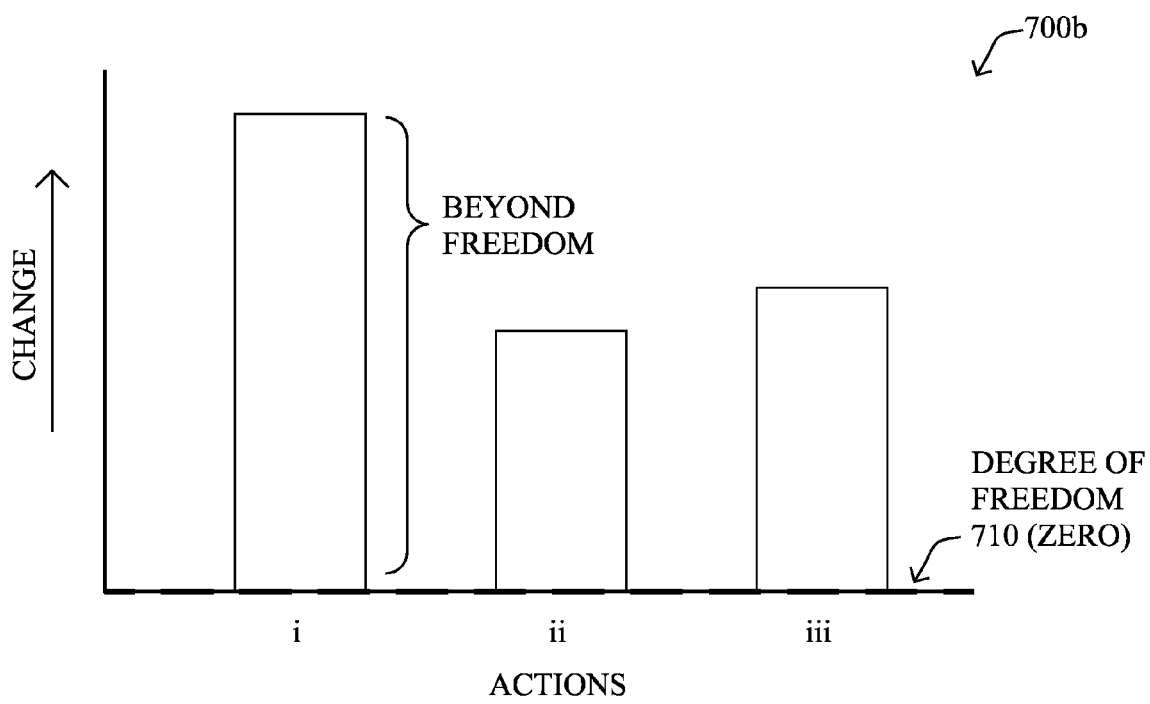
Figure 7C:
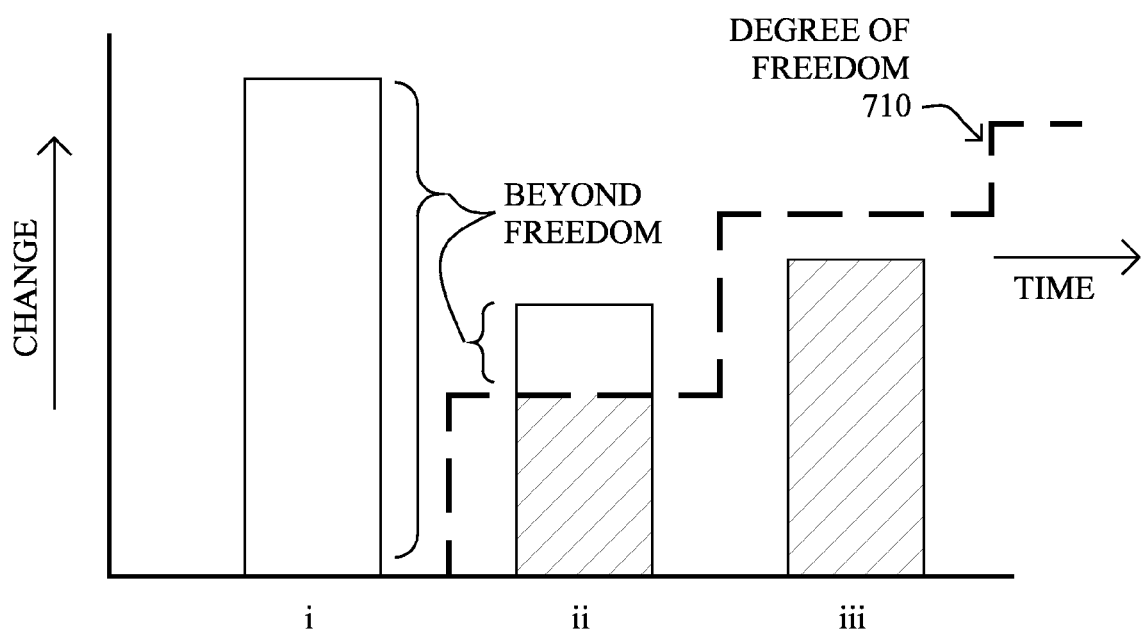

With reference to illustrations 700*a*-700*c* of FIGS. 7A-7C, respectively, the computed degree of freedom may result in a variety of different policy-based control of the machine learning systems 520. For instance, in FIG. 7A, the computed degree of freedom 710 results in a change limitation for a particular machine learning system, such that the respective action (e.g., "i", "ii" and "iii") of the particular machine learning is system may be prevented from making changes beyond the change limitation 710. For example, action "i" may be associated with too much freedom (e.g., too large a change), and may either be entirely prevented (i.e., no action is performed), or else the action is limited (e.g., only changing a certain amount of values, shown as the hashed block). Alternatively, as shown in FIG. 7B, a degree of freedom may actually result in no freedom for a particular machine learning system, where, as described below, the particular machine learning system with no freedom may still send performance scoring feedback based on simulations of the respective action of the particular machine learning system.

In addition to indicating a singular degree of freedom, as shown in FIG. 7C computing the degree of freedom 710 may result in an increasing degree of freedom over time for a particular machine learning system (e.g., in steps or increments 710 as shown or else a more gradual and/or linear increase), such that the respective action of the particular machine learning system is given the increasing degree of freedom to act over time until intervention by the management system (e.g., an updated degree of freedom, for better or worse).

Note that the computed degree of freedom for a particular machine learning system may also depend upon an expected outcome for each iteration of an action. For instance, if the expected gains are significant, a greater degree of freedom may be afforded, such as, for example, allowing 10% freedom for a 50% better result, while allowing 25% freedom for a 100% better result, and so on.

In accordance with one or more of the embodiments herein, the management system 510 may be configured to compute the degree of freedom based on one or more policies (such as those described herein), but may also accept manual input to the degree of freedom, such as in the form of user-defined boundaries (e.g., no more than 50% freedom), user-based adjustments (e.g., increasing or decreasing a particular MLS' freedom), and so on.

Referring again to FIG. 6, a newly defined message 640 (e.g., called the Machine is Learning Policy message or "MLP( )" herein) is specified that encodes the degree of freedom given by the MLPE 514 to a given MLS 520. The MLP( ) message may also specify the rate at which the NMS 512 requires scoring feedback from the MLS and potentially the scoring algorithm. For example, the MLPE may require the TPA to provide every X seconds an estimate of the Mean Relative Error (MRE) of its prediction over the past Y seconds. The encoding depends on the action performed by the MLS (adjustment of a shaper, path change, etc.) using an XML schema or a code point based approach similar to a TLV carried out within the MLP( ) message. As an alternative to having the performance scoring feedback reported from the machine learning system to the management system at a specified rate, one or more embodiments also configure the MLS to report in response to a particular event (e.g., performance of an action, a significant change in feedback results, etc.).

Figure 8A:
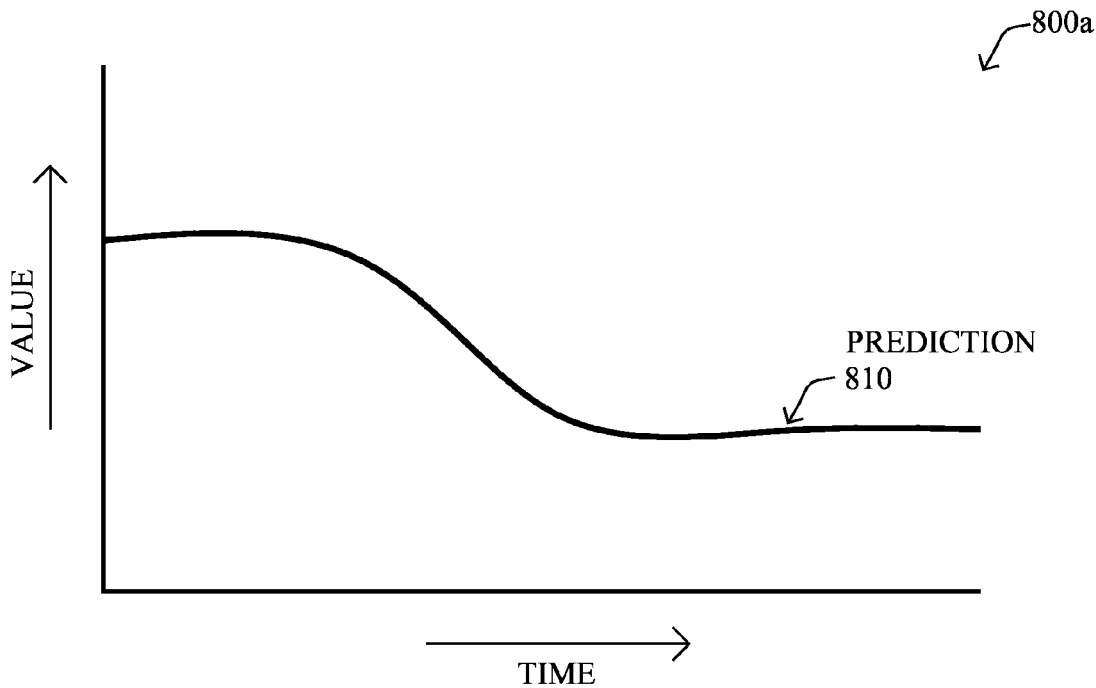
FIGS. 8A-8B illustrate an example of predictions and error rates.
Figure 8B:
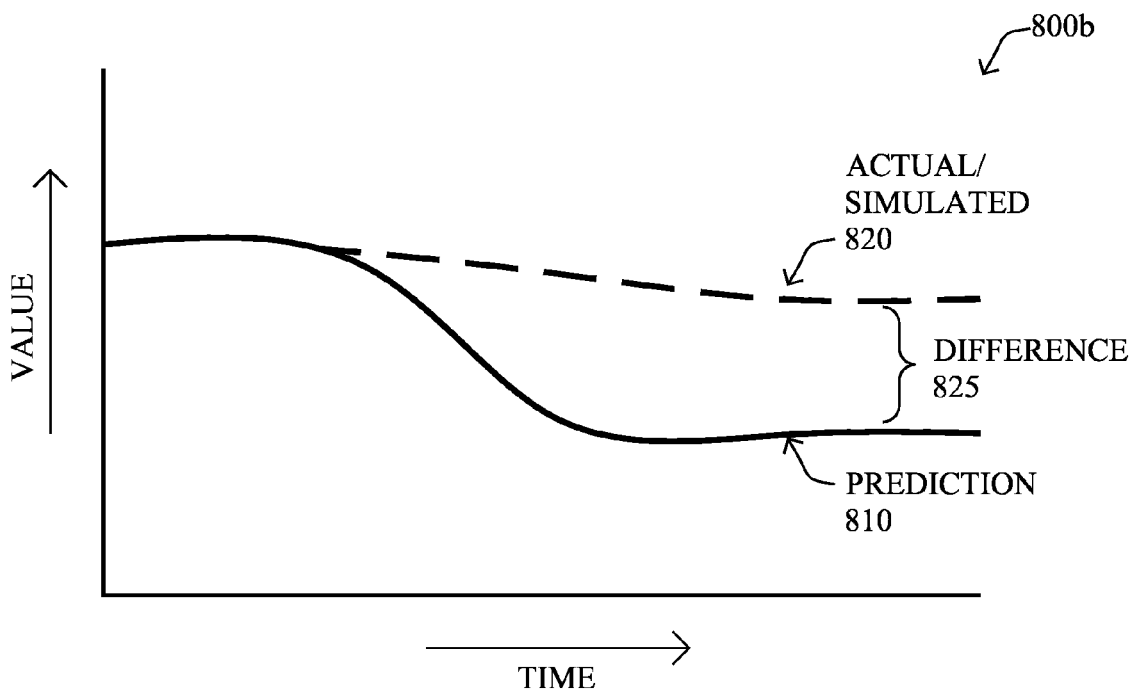

With reference to charts 800*a* and 800*b* of FIGS. 8A and 8B, respectively, the performance scoring feedback may be based generally on a difference 825 (e.g., mean relative error, MRE) between a predicted outcome 810 by the MLS 520 and an actual (or simulation-based) result 820. In particular, the calculation of MRE can differ from component to component in the above architecture. For example, the TPA may provide a prediction of upcoming traffic trends and the error will be computed as the difference in the observed and predicted value normalized in some fashion. Similarly, for the NAM, the error may be computed in a similar fashion but will be for attributes such as delay, jitter, loss, and bandwidth. For computing the MRE with respect to the dynamic shaper, CAC and dynamic path selection, the process will be more involved. For example, once the PCM recommends the shaper size to be changed, the MRE will be computed using the comparison between two conditions: one where hypothetically the shaper configuration was changed dynamically and second: the current situation.

In order to determine the state of the system had an action been performed (e.g., had the PCM recommendation been engaged), a new component to track and model this condition is described herein. In particular, this component keeps track of the system is while simulating the proposed action (e.g., dynamic shaper configuration). This helps to compute the MRE with respect to more complex actions, such as the dynamic shaper. For example, a small MRE signifies that the recommendation of the PCM module with respect to the dynamic shaper was accurate. These instances where the MRE is low will be added to the scoring and will be carrying a higher weight. Similar modules may be used for Dynamic CAC and Dynamic Path Control in order to effectively generate the corresponding MRE and thus accurately score the effectiveness.

Figure 9:
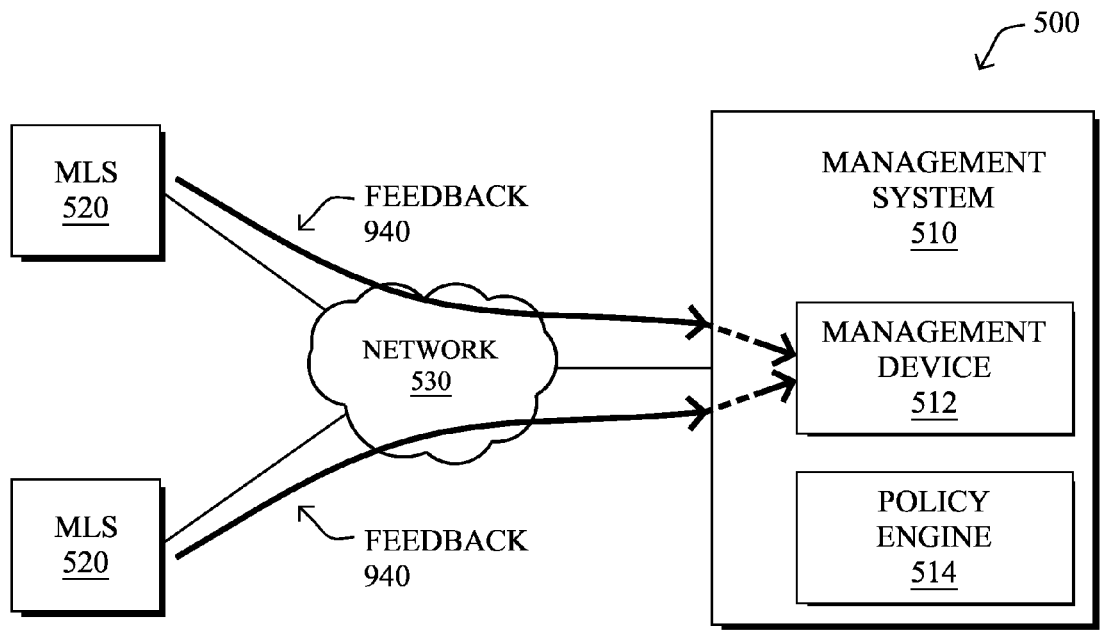
FIG. 9 illustrates an example communication of performance scoring feedback.
Figure 10:
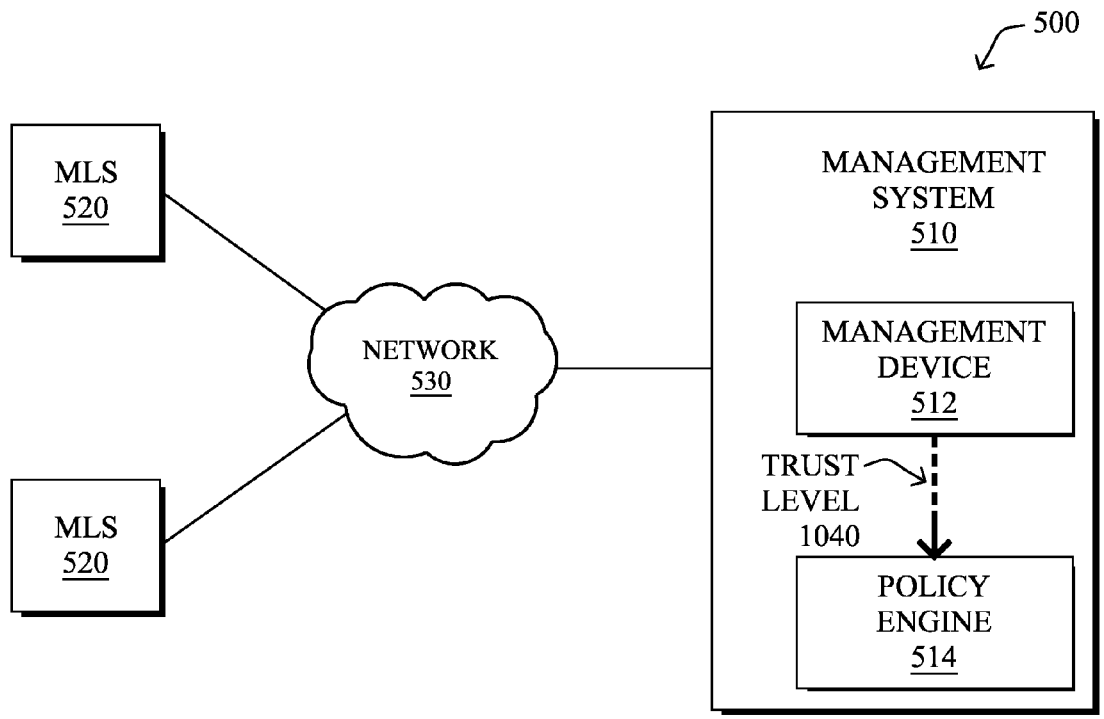
FIG. 10 illustrates an example communication of a trust level.

The scoring mechanism (a feedback loop) between the management system 510 (e.g., management device/NMS 512) and an MLS 520 is another aspect of the techniques herein. In particular, upon receiving the MLP( ) message 640, each MLS is driven by the policy enforced by the MLPE 514, and starts reporting the outcome of its scoring system to the management system using a newly specified feedback message 940 in FIG. 9 called the "Scoring( )" message. When specified, the scoring algorithm is derived from the MLP( ) message 640 received from the MLPE( ). When not specified the MLS may choose one or more techniques of scoring and may specify the used scoring technique(s) to the management system 510 (e.g., in discovery message 540 or in reported feedback message 940).

In one embodiment, the MLS 520 may send periodic scores, or upon detecting a specific event, as mentioned above. For example, if the MLS is in charge of adjusting the shaper according to the predicted bandwidth, it may send message 940 every X seconds with the MRE of its prediction, or only when the PCM effectively makes a shaping adjustment resulting to a local decision, in which case the Scoring() message 940 will report the score of the predictive bandwidth algorithm along with the set of local actions taken by the PCM (such as a change of the shaping rate). In yet another embodiment, the Scoring() message 940 may report additional information related to local metrics (e.g., after adjusting the shaping rate, the MLS may monitor the queue lengths, a useful parameter that may be used by the end user to determine how effective (trustable) is the MLS).

A fourth aspect of the techniques herein relates to the algorithm used by the is management system 510 (e.g., the management device or NMS 512) in order to build a newly defined "trust level" (TL) metric that is used to adjust the policy for the MLS degree of freedom. Said differently, the NMS will use an algorithm taking the scoring feedback from a MLS in order to measure its level of trust in the MLS, which will in turn be forwarded to the MLPE 514. For instance, referring again to the previous example of a NAM component predicting bandwidth and a PCM adjusting the shaper, the NMS may continuously monitor the score (accuracy of the prediction using for example the MRE) and potentially the benefit of the action taken on the shaper adjustment.

Depending on the criteria used by the management system, the TL metric may be governed by the evaluation of a different metric. For example, if the MLS only performs prediction, the TL metric may be a function of the MRE of the predictive algorithm provided by the MLS. If the MLS objective is to adjust shaper, the management system may take into account the prediction accuracy, but also the effect of the triggered action (e.g., adjusting a shaper) on the traffic observing various parameters, typically by monitoring the mean opinion score (MOS) of various applications. In other words, if the shaper reports very accurate predictions, but causes the MOS of critical applications to decrease, then its TL metric may become low, in turn causing the MLPE to change the policy for the shaper (for instance, by prohibiting any shaping below a given user-defined data rate, or making its decisions only informative). Such an algorithm could be in the form of a linear or non-linear credit-based algorithm.

Figure 11:
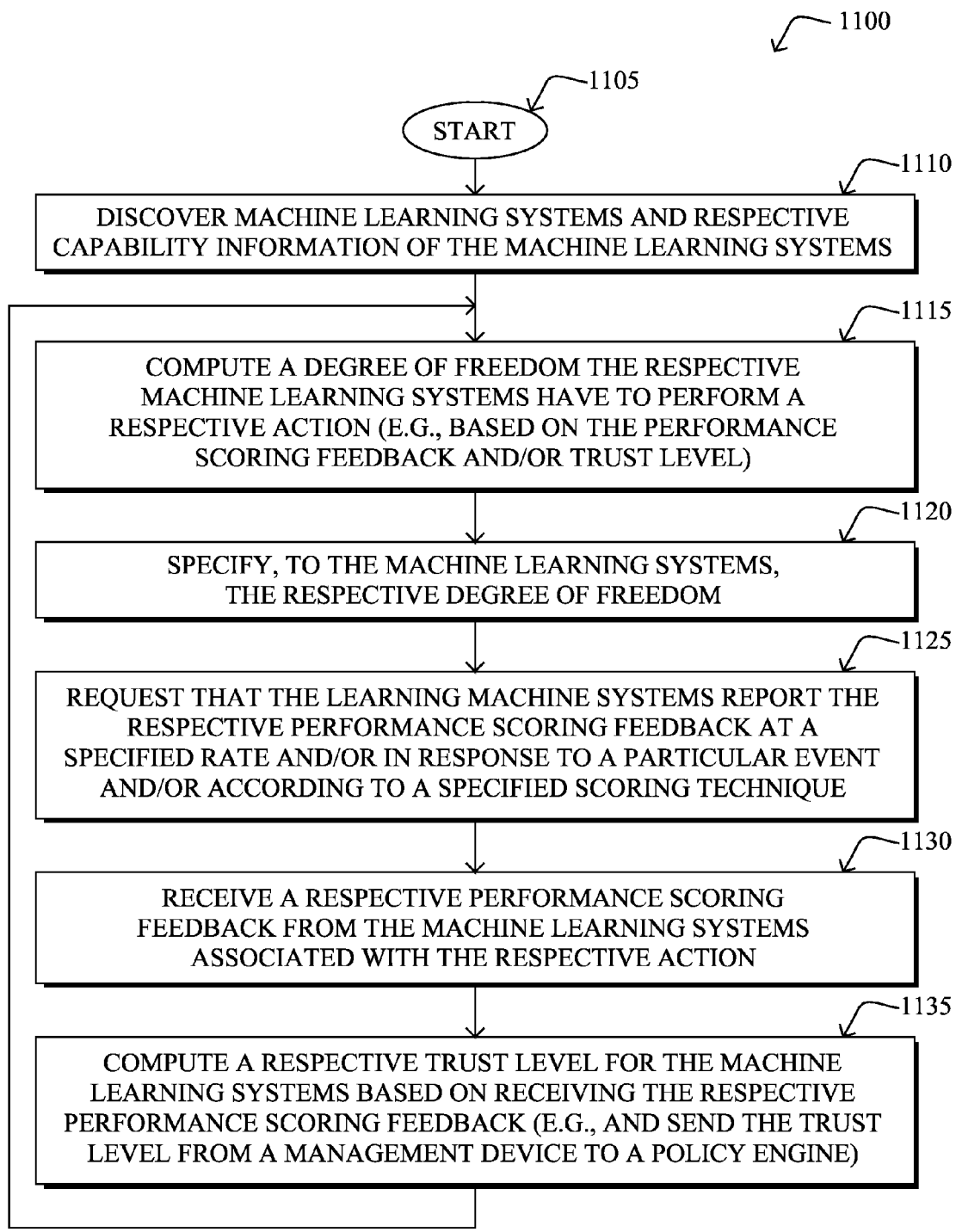
FIG. 11 illustrates an example simplified procedure for distributed machine learning autoscoring in accordance with one or more embodiments described herein, particularly from the perspective of a management system.

FIG. 11 illustrates an example simplified procedure 1100 for distributed machine learning autoscoring in accordance with one or more embodiments described herein, particularly from the perspective of a management system. The procedure 1100 may start at step 1105, and continues to step 1110, where, as described in greater detail above, a management system 510 (e.g., the management device 512) determines (discovers) respective capability information of one or more machine learning systems. The capability information includes at least an action the respective machine learning system is configured to perform, but as mentioned above, may also include a scoring technique used by the one or more machine learning systems to generate respective performance is scoring feedback. Note that as also mentioned above, discovering the machine learning systems may be dynamic (e.g., changing capabilities, moving devices, etc.), or else may be static (e.g., one-time discovery).

In step 1115, the management system 510 (e.g., policy engine 514) computes an initial degree of freedom the respective machine learning systems 520 have when performing their respective action (e.g., accepting manual input to the degree of freedom, as mentioned above). As described above, the computed degree of freedom may result in various policies, such as no freedom (where a particular machine learning system with no freedom still sends respective performance scoring feedback based on simulations of the respective action of the particular machine learning system), a change limitation (such that the respective action of the particular machine learning system is prevented from making changes beyond the change limitation), an increasing degree of freedom over time (such that the respective action of the particular machine learning system is given the increasing degree of freedom to act over time until intervention by the management system), and so on. Note also that the degree of freedom may also depend upon an expected outcome for each iteration of the respective action for the particular machine learning system (e.g., allowing 10% freedom for a 50% better result, and 25% freedom for a 100% better result, etc.).

In step 1120, the management system 510 (e.g., policy engine 514) specifies to the one or more machine learning systems 520 their respective degree of freedom, such as in message 640 above. Note that in step 1125, the management system may also request that the learning machine systems report the respective performance scoring feedback at a specified rate, in response to a particular event, and/or according to a specified scoring technique.

In step 1130, the management system 510 (e.g., management device 512) receives a respective performance scoring feedback from each of the machine learning systems 520 associated with their respective action (e.g., as well as additional metrics within the respective performance scoring feedback, as noted above). In one embodiment, in step 1235, the management device 512 computes a respective trust level for the one or more is machine learning systems based on receiving the respective performance scoring feedback, and sends the trust level from the management device to the policy engine 514 (in message 1040), such that the policy engine computes the degree of freedom based on the trust level. Alternatively, a contained management system 510 may both receive the performance scoring feedback and compute the degree of freedom based thereon directly.

The procedure 1100 then returns to step 1120 where the management system specifies the updated degree of freedom to the machine learning systems 520. The procedure 1100 may continue in this manner, and may discover new machine learning systems, may receive additional manual input (e.g., to the trust level), and so on.

Figure 12:
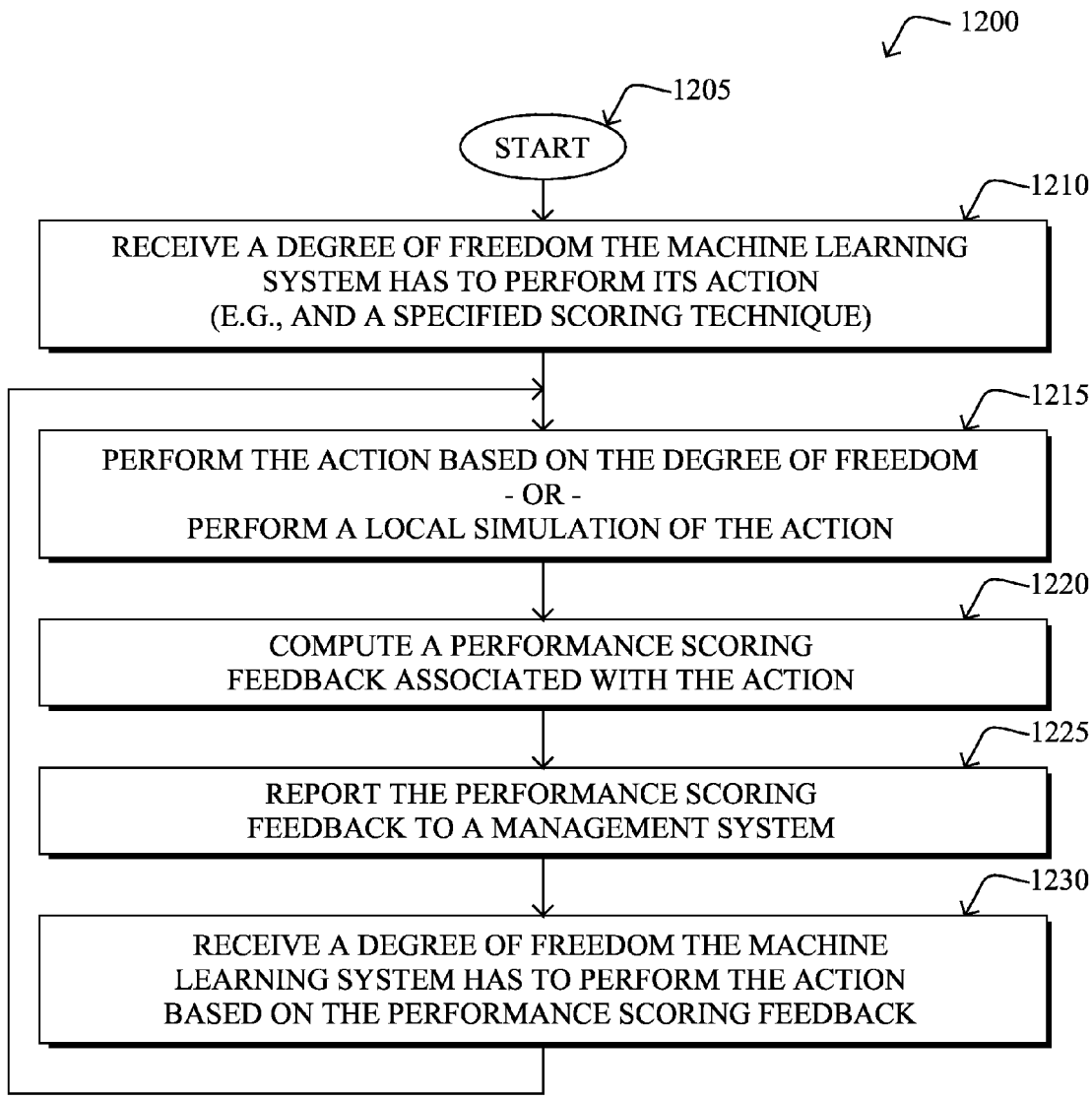
FIG. 12 illustrates an example simplified procedure for distributed machine learning autoscoring in accordance with one or more embodiments described herein, particularly from the perspective of a machine learning system.

Additionally, FIG. 12 illustrates an example simplified procedure 1200 for distributed machine learning autoscoring in accordance with one or more embodiments described herein, particularly from the perspective of a machine learning system. The procedure 1200 may start at step 1205, and continues to step 1210, where, as described in greater detail above, the machine learning system 520 receives, from the management system 510 (e.g., policy engine 514), a degree of freedom the machine learning system has to perform its configured action (e.g., and a specified scoring technique).

In step 1215, the machine learning system may perform its action based on the degree of freedom, which, if having insufficient freedom, may result in performing a local simulation of the action by the machine learning system. Based on the performance (or locally simulation of action performance), in step 1220 the machine learning system may then compute a performance scoring feedback associated with the action (e.g., according to a specified scoring technique or a default technique). Accordingly, in step 1225, the machine learning system reports the performance scoring feedback to a management system 510 (e.g., to management device 512). As noted above, reporting the performance scoring feedback may be at a specified rate and/or in response to a particular event. Also, additional metrics may also be reported within the performance scoring feedback.

According to the techniques herein, in step 1230 the machine learning system may receive, from the management system, an updated degree of freedom the machine learning system has to perform its configured action based on the performance scoring feedback, and the process 1200 continues the feedback loop as described above.

It should be noted that while certain steps within procedures 1100-1200 may be optional as described above, the steps shown in FIGS. 11-12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1100-1200 are described separately, certain steps from each procedure may be incorporated into each other procedure, and the procedures are not meant to be mutually exclusive.

The techniques described herein, therefore, provide for distributed machine learning autoscoring. In particular, the techniques herein address a fundamental concern to maintain some form of control on a machine learning system (e.g., for an SLN). As noted, the end user may at first not allow the MLS to perform any action, and increase the degree of liberty of the system as the user end/NMS determines that the system is indeed effective. For instance, the techniques herein target the next-generation intelligent WAN, where decisions about path selection and traffic shaping are taken based on the output of ML-based predictive algorithms. Since the accuracy or such predictions shows a certain degree of variability and a wrong decision can have a significant negative input on QoS, the techniques herein propose a mechanism for tuning the action based on ML predictions according to the estimated reliability of such predictions. In particular, the techniques herein describe a policy-based mechanism for limiting the "intensity" of the actions taken based on a feedback mechanism, which compares past predictions with the actual measured conditions of the network. If the predictions match well to the network conditions that were subsequently observed, the policy engine may allow for a larger degree of freedom with respect to the prediction based decisions. Accordingly, the techniques herein offer a crucial safeguard with respect to predictions which may not is always be accurate (especially in the first phases of the learning process). In addition, it allows an administrator to decide how much it wants to rely on ML predictions.

While there have been shown and described illustrative embodiments that provide for distributed machine learning autoscoring, it is to be understood that various other adaptations and modifications may be made within the spirit and scope of the embodiments herein. For example, the techniques herein may be adapted for use within any kind of network using learning machines, and is not limited to those mentioned above. Additionally, the protocols discussed herein are exemplary only and other protocols may be used within the scope of the teachings herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a management system in a computer network, respective capability information of one or more machine learning systems, wherein the capability information includes at least an action the respective machine learning system is configured to perform in the computer network, wherein the respective action adjusts or changes how the computer network operates;
    receiving, at the management system, for each of the one or more machine learning systems, respective performance scoring feedback associated with the respective action;
    computing, by the management system, a degree of freedom for each machine learning system based on the performance scoring feedback, wherein the degree of freedom is an amount of autonomy a particular machine learning system has to act over time regarding performing the respective action until intervention by the management system; and
    specifying, from the management system to the one or more machine learning systems, the respective degree of freedom for each machine learning system to make a decision regarding the respective action in the computer network.

2. The method as in claim 1, wherein the management system comprises a management device and a policy engine, the method further comprising:
    computing, by the management device, a respective trust level for the one or more machine learning systems based on receiving the respective performance scoring feedback; and
    sending the trust level from the management device to the policy engine,
    wherein computing the degree of freedom is performed by the policy engine based on the trust level.

3. The method as in claim 2, wherein the trust level is computed using a credit-based algorithm.

4. The method as in claim 1, further comprising:
    accepting manual input to the degree of freedom.

5. The method as in claim 1, wherein the capability information further includes a scoring technique used by the one or more machine learning systems to generate the respective performance scoring feedback.

6. The method as in claim 1, wherein discovering the one or more machine learning systems comprises one of either dynamic discovery or static discovery.

7. The method as in claim 1, wherein the computed degree of freedom results in no freedom for a particular machine learning system, and wherein the particular machine learning system with no freedom still sends respective performance scoring feedback based on simulations of the respective action of the particular machine learning system.

8. The method as in claim 1, wherein the computed degree of freedom results in a change limitation for a particular machine learning system such that the respective action of the particular machine learning system is prevented from making changes beyond the change limitation.

9. The method as in claim 1, wherein the computed degree of freedom results in an increasing degree of freedom over time for a particular machine learning system, such that the respective action of the particular machine learning system is given the increasing degree of freedom to act over time until intervention by the management system.

10. The method as in claim 1, wherein the computed degree of freedom for a particular machine learning system depends upon an expected outcome for each iteration of the respective action for the particular machine learning system.

11. The method as in claim 1, further comprising:
requesting, by the management system, that the one or more learning machine systems report the respective performance scoring feedback at a specified rate.

12. The method as in claim 1, further comprising:
requesting, by the management system, that the one or more learning machine systems report the respective performance scoring feedback in response to a particular event.

13. The method as in claim 1, further comprising:
requesting, by the management system, that the one or more learning machine systems report the respective performance scoring feedback according to a specified scoring technique.

14. The method as in claim 1, further comprising:
receiving, by the management system, additional metrics within the respective performance scoring feedback.

15. The method as in claim 1, wherein the respective performance scoring feedback is based on a respective local simulation of action performance by the one or more machine learning systems.

16. A method, comprising:
computing, by a machine learning system in a computer network, a performance scoring feedback associated with an action the machine learning system is configured to perform in the computer network, wherein the action adjusts or changes how the computer network operates;
reporting the performance scoring feedback from the machine learning system to a management system;
receiving, at the machine learning system from the management system, a degree of freedom the machine learning system has, wherein the degree of freedom is an amount of autonomy that the learning machine has to act over time regarding performing the respective action until intervention by the management system, and wherein the degree of freedom is computed based on the performance scoring feedback reported to the management system; and
performing the action by the machine learning system based on the degree of freedom.

17. The method as in claim 16, further comprising:
reporting the performance scoring feedback from the machine learning system to the management system at a specified rate.

18. The method as in claim 16, further comprising:
reporting the performance scoring feedback from the machine learning system to the management system in response to a particular event.

19. The method as in claim 16, further comprising:
receiving, at the machine learning system, a specified scoring technique from the management system; and
computing the performance scoring feedback according to the specified scoring technique.

20. The method as in claim 16, further comprising:
reporting additional metrics within the performance scoring feedback.

21. The method as in claim 16, further comprising:
performing a local simulation of the action by the machine learning system; and
computing the performance scoring feedback according to the local simulation of action performance.

22. A system, comprising:
one or more network interfaces to communicate with a network;
one or more processors coupled to the network interfaces and configured to execute one or more processes; and
at least one memory configured to store a first process executable by at least one processor, the first process when executed operable to:
determine respective capability information of one or more machine learning systems, wherein the capability information includes at least an action the respective machine learning system is configured to perform in the computer network, wherein the respective action adjusts or changes how the computer network operates; and
receive, for each of the one or more machine learning systems, respective performance scoring feedback associated with the respective action;
the at least one memory configured to store a second process executable by at least one processor, the second process when executed operable to:
compute a degree of freedom for each machine learning system based on the performance scoring feedback, wherein the degree of freedom is an amount of autonomy a particular machine learning system has to act over time regarding performing the respective action until intervention by the management system; and
specify the respective degree of freedom to the one or more machine learning systems for each machine learning system to make a decision regarding the respective action in the computer network.

23. The system as in claim 22, wherein the system comprises a management device configured to store and execute the first process and a policy engine configured to store and execute the second process, the first process when executed further operable to:
compute a respective trust level for the one or more machine learning systems based on receiving the respective performance scoring feedback; and
send the trust level from the management device to the policy engine, the second process when executed further operable to:
receive the trust level from the management device at the policy engine,
wherein the second process when executed to compute the degree of freedom based on the performance scoring feedback is based on the trust level received from the management device.

24. An apparatus, comprising:
one or more network interfaces to communicate with a network;
a processor coupled to the network interfaces and configured to execute one or more processes; and
a memory configured to store a machine learning system process executable by the processor, the process when executed operable to:
compute a performance scoring feedback associated with an action the machine learning system is configured to perform in the computer network, wherein the action adjusts or changes how the computer network operates;
report the performance scoring feedback to a management system;
receive, from the management system, a degree of freedom the machine learning system has, wherein the degree of freedom is an amount of autonomy that the learning machine has to act over time regarding performing the respective action until intervention by the management system, and wherein the degree of freedom is computed based on the performance scoring feedback reported to the management system; and perform the action based on the degree of freedom.

25. The apparatus as in claim 24, wherein the process when executed is further operable to:

perform a local simulation of the action; and compute the performance scoring feedback according to the local simulation of action performance.

* * * * *

UNITED STATES PATENT AND TRADEMARK OFFICE
CERTIFICATE OF CORRECTION

PATENT NO. : 9,836,696 B2
APPLICATION NO. : 14/339347
DATED : December 5, 2017
INVENTOR(S) : Jean-Philippe Vasseur et al.

It is certified that error appears in the above-identified patent and that said Letters Patent is hereby corrected as shown below:

In the Specification

In Column 3, Line 8, please amend as shown:
defined protocols, such as a set of rules defining In Column 3, Line 11, please amend as shown:
In the context, a protocol may be further intercon- In Column 6, Line 54, please amend as shown:
in a video conference appearing chopping to the end users.

In Column 10, Line 35, please amend as shown:
metrics based on feature data 450. In some implementa- In Column 11, Line 7, please amend as shown:
As long as both sources agree, there is no reason to In Column 11, Line 46, please amend as shown:
the SLAs continue to be met (e.g., by sending commands In Column 13, Line 39, please amend as shown:
machine learning system performs the action based on the In Column 14, Line 45, please amend as shown:
(i.e., "static discovery"), the MLS 520 may be discovered In Column 15, Line 18, please amend as shown:
machine learning system may be prevented from making Signed and Sealed this
Twenty-ninth Day of December, 2020

Andrei Iancu
*Director of the United States Patent and Trademark Office*

CERTIFICATE OF CORRECTION (continued)
U.S. Pat. No. 9,836,696 B2

In Column 15, Line 57, please amend as shown:
(e.g., called the Machine Learning Policy message or In Column 16, Line 31, please amend as shown:
track of the system while simulating the proposed action In Column 17, Line 5, please amend as shown:
algorithm used by the management system 510 (e.g., the In Column 17, Line 48, please amend as shown:
respective performance scoring feedback. Note that as In Column 18, Line 23, please amend as shown:
level for the one or more machine learning systems based In Column 19, Line 38, please amend as shown:
predictions which may not always be accurate (especially